March 22, 1966　　　　W. C. LAPPLE　　　　3,241,917
PRODUCTION OF PHOSPHORUS PENTOXIDE FROM A PHOSPHATIC ORE
Filed June 20, 1962　　　　　　　　　　　　2 Sheets-Sheet 1

INVENTOR.
WALTER C. LAPPLE
BY Frank Ianno
Eugene N. Reeves
Milton Zucker
ATTORNEYS March 22, 1966  W. C. LAPPLE  3,241,917
PRODUCTION OF PHOSPHORUS PENTOXIDE FROM A PHOSPHATIC ORE
Filed June 20, 1962  2 Sheets-Sheet 2
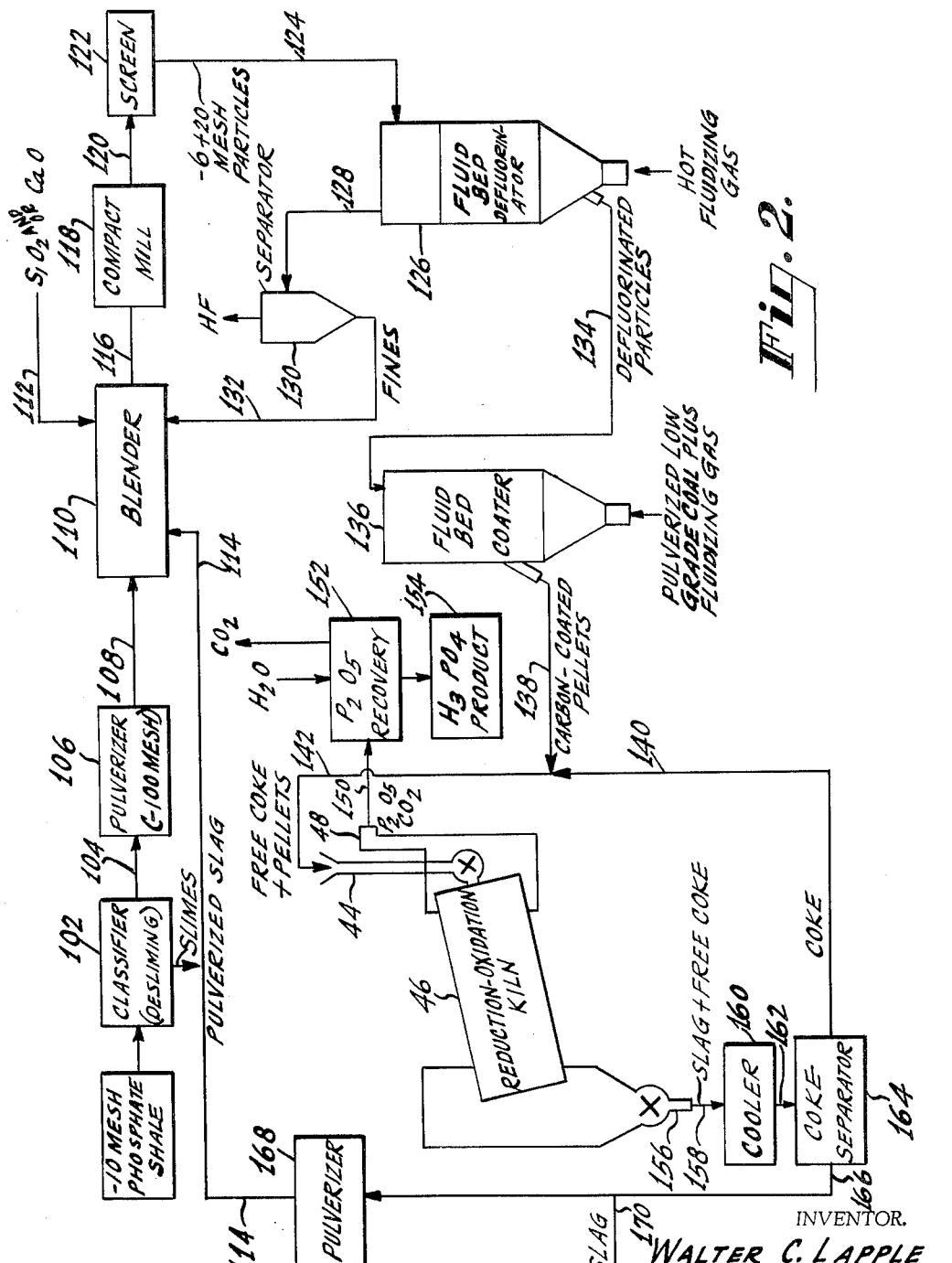
INVENTOR.
WALTER C. LAPPLE United States Patent Office 3,241,917
Patented Mar. 22, 1966

3,241,917
PRODUCTION OF PHOSPHORUS PENTOXIDE
FROM A PHOSPHATIC ORE
Walter C. Lapple, Mountainside, N.J., assignor to FMC Corporation, New York, N.Y., a corporation of Delaware
Filed June 20, 1962, Ser. No. 203,898
7 Claims. (Cl. 23—165)

This invention relates to the direct production of phosphorus pentoxide ($P_2O_5$) in a one-step process by the reduction of a phosphate ore to elemental phosphorus and the subsequent oxidation of the phosphorus to phosphorus pentoxide within physically unseparated reaction zones.

Commercial preparation of pure phosphorus pentoxide is usually carried out in two steps—reduction of a phospate ore to elemental phosphorus, followed by oxidation of the phosphorus to phosphorus pentoxide. The first reaction, which involves reduction of the phosphate to $P_4$, is generally carried out in a high terperature electric furnace. In one type of electric furnace, the ore is introduced along with coke particles into the furnace and heated until phosphorus vapor is evolved. The coke serves both as a reactant in the phosphate-reducing reaction and for conducting electricity through the bed. Heating is carried out by passing an electric current into the coke-bed mixture by means of conductive electrodes. The ore is heated until a molten bed composed principally of slag is formed and all of the phosphate values have been recovered. The phosphorus which is given off overhead is recovered in gaseous form while the molten slag is recovered at the base of the furnace.

The elemental phosphorus thus produced is oxidized commercially in various forms of furnace equipment. A particularly desirable type is described in U.S. Patent No. 2,708,620, issued to Henry S. Winnicki on May 17, 1955. In this process, phosphorus is burned with air to form $P_2O_5$ within an unlined, metal-wall tower. The $P_2O_5$ is absorbed by liquid films of phosphoric acid (aqueous solutions of $P_2O_5$) which run down the inside of the tower and accumulate in a sump at the base of the column. The accumulated acid in the sump is pumped to a heat exchanger for cooling, thereby removing the exothermic heat produced by oxidation of the phosphorus. In this type of oxidation system, the heat of combustion cannot be recovered for useful purposes.

It has been desired to combine the oxidation and reduction reactions into a single-step process, to achieve direct production of pure $P_2O_5$ from a phosphatic ore, because the heat requirements of the reduction step can be supplied to a large extent by the heat given off in the exothermic oxidation of the phosphorus. This has been attempted by processes such as described in U.S. Patent 2,075,212, issued to C. L. Levermore et al. on Mar. 30, 1937. In this process, the reduction of the phosphorus takes place within the inner of two concentric kilns. The phosphorus is oxidized in the intermediate space between the outer and inner kilns and $P_2O_5$ is obtained as the product. The heat of oxidation is transferred to the reduction zone through the walls of the inner kiln. The process is not commercially acceptable because heat exchange through the solid inner kiln wall is difficult, and because of the severe corrosion of the inner kiln walls.

It is an object of the present invention to produce phosphorus pentoxide from a phosphatic ore by simultaneously reducing the phosphatic or to elemental phosphorus and oxidizing the phosphorus to $P_2O_5$ within physically unseparated reaction zones and in direct heat exchange. This and other objects will be apparent from the following disclosure.

It has now been found that a phosphate-containing ore can be reduced to elemental phosphorus and the phosphorus oxidized to phosphorus pentoxide in a one-step process carried out within physically unseparated reaction zones by introducing compacted particles containing a phosphatic ore, silica and a carbonaceous material into a heating zone, placing an overlay of carbon particles such as coke, on the compacted particles, heating the compacted particles to from about 1200° C. to about 1500° C., whereby carbon monoxide and elemental phosphorus are evolved, oxidizing the phosphorus and carbon monoxide to $P_2O_5$ and $CO_2$, respectively, in the upper section of the heating zone by means of air introduced into the heating zone in the presence of the compacted particles and free coke, passing the $P_2O_5$ and $CO_2$ stream countercurrently to the flow of compacted particles, whereby the heat evolved during the oxidation is used to heat the compacted particles to about 1200° C. to 1500° C. and supply the necessary endothermic heat of reduction required for the phosphorus evolution, recovering $P_2O_5$ from one end of the heating zone and recovering calcium silicate slag and coke from the opposite end of the heating zone, and preferably separating the coke from the calcium silicate slag and recycling the coke to the heating zone with additional compacted particles.

In the present process, the preferred major piece of equipment employed is a rotary kiln, chiefly because of the high heat transfers which are obtained within this apparatus. However, a travelling grate, a rotary hearth or other suitable equipment can also be employed. The feed, which enters the feed end of the kiln, is a mixture of compacted particles and preferably "free" coke. The term, free coke, as employed in the specification, refers to coke which is not combined with the compacted particles in any manner and which is free to rotate in the kiln independent of the compacted particles. The compacted particles are made up either by mixing a phosphate ore, silica and coke, all of which have been finely ground to about −100 mesh, and subsequently compacting, e.g., pelletizing the resultant mixture, or by coating compacted phosphate ore containing silica with carbon. The carbonaceous material which is included within the compacted pellets must be present in at least stoichiometric amounts to reduce the phosphate values within the compacted particle. The silica is added, when necessary to supplement the $SiO_2$ content in the phosphatic feed, in amounts dependent upon the ratio of $CaO/SiO_2$ desired in the final slag product. For example, in one run, it has been found that compacted particles containing phosphate rock (having a composition of 48.5% CaO, 32.53% $P_2O_5$, 7.83% $SiO_2$ and minor amounts of other minerals) in the amount of 68.0 weight percent, silica (sand) in the amount of 20.4 weight percent and carbonaceous material (coke) in the amount of 11.6 weight percent, are suitable. The compacted particles are introduced into the kiln, along with free coke in a free coke to compacted particle ratio of about 4:1. In general, the bed, comprising the compacted particles and free coke, may occupy from 35% to 40% of the kiln volume The compacted particles must be substantially smaller than the free coke particles when employing a rotating kiln so that they remain submerged within the free coke mass during the rotation of the kiln. However, when employing non-tumbling equipment such as a moving grate, or pallet, the free-coke particles can be larger or smaller than the compacted particles because the compacted particles can be positioned beneath the free-coke bed during the bed make-up.

The compacted particles and the coke are introduced into the feed end section of the kiln and are heated to reaction temperatures by the transfer of heat, as hereinafter described, from the combustion of both elemental phosphorus to $P_2O_5$ and of carbon monoxide to carbon dioxide in a gas stream at the top of the kiln. As the compacted particles progress towards the reduction zone of the kiln, they are progressively heated until they reach a temperature of about 1150° C. At about this temperature, a reaction commences within the compacted particles as follows:

$$Ca_3(PO_4)_2 + 5C + 3SiO_2 \rightarrow 3[CaO \cdot SiO_2] + \tfrac{1}{2}P_4 + 5CO$$

The exact ratio of $CaO/SiO_2$ in the final slag is determined by the ratio of these components in the feed particle. The phosphorus and carbon monoxide thus evolved flow upward through the bed of free coke to the top of the rotating kiln. The free coke which has been heated to temperatures of about 1150° C. also begins to combine with any oxygen in close proximity to the bed to produce carbon monoxide. As the feed charge passes into the reduction zone of the kiln, the temperature gradually increases at the slag-discharge end of the kiln to about 1400° C. Temperatures of from about 1200° C. to about 1500° C. are necessary to obtain good phosphorus elimination. At these temperatures, phosphorus and carbon monoxide evolution takes place to substantial completion in accordance with the equation given above. The evolved phosphorus and carbon monoxide rise to the top of the rotating kiln in a steady upward flowing stream. Regulated amounts of air are introduced into the top of the kiln through suitable openings throughout the length of the kiln in order to oxidize the phosphorous to $P_2O_5$ and the carbon monoxide to $CO_2$. These reactions occur as follows:

$$P_4 + 5O_2 \rightarrow 2P_2O_5$$
$$2CO + O_2 \rightarrow 2CO_2$$

The above oxidation reactions have been found to supply the heat necessary to carry out the reduction of the phosphate ore. Thus, the heat requirement of the reduction step in the process is balanced the exothermic heat evolved during the oxidation step. Little or no external heat need be added in the process, other than that required for start up, depending upon the heat loss of the equipment being employed. Where heat losses require the addition of external heat, this can be supplied by introduction of a carbonaceous fuel and air at the slag discharge end of the kiln. The products of combustion, i.e., $CO_2$ and/or $H_2O$ will function as oxidants in that they will oxidize $P_4$ to $P_2O_5$ if present in sufficient quantities.

Control of the temperature and atmosphere within the kiln is achieved by regulating the amount of air which is introduced. This is best accomplished under normal circumstances by maintaining the kiln under a partial vacuum. The oxidizing atmosphere (including excess air) which is present at the top of the kiln flows towards the feed end of the kiln in a direction opposite to the flow of phosporus-containing ore and free coke at the bottom of the kiln. This enables the heat which is given off during the oxidation of the phosphorus and carbon monoxide to supply the heat necessary for the phosphorus reduction and also to preheat the phosphorus-containing ore which enters at the feed entrance of the kiln. The largest amount of heat is liberated at the slag-discharge end of the kiln where phosphorus evolution is greatest and where the evolved $P_4$ and CO are available for combustion. Similarly, the greatest need for heat is at the slag-discharge end of the kiln since complete phosphorus evolution requires large quantities of heat.

The $P_2O_5$, $CO_2$ and nitrogen, which are present in the oxidizing atmosphere, are recovered from the feed end of the kiln by suitable conduits and recovery means. The $P_2O_5$ is best recovered by passing it into an aqueous solution, thereby forming phosphoric acid, or into an alkaline solution to form alkali phosphate. The spent compacted particles, which have been depleted of their phosphorus values, are removed from the slag-discharge end of the kiln as a calcium silicate, along with the non-oxidized free coke. The free coke is separated from the calcium silicate and recycled to the feed end of the kiln to repeat the cycle with fresh phosphorus-containing compacted particles. The calcium silicate slag is discharged at the slag-discharge end of the kiln.

In the above-described process, the free coke serves several important functions. Initially, the free coke physically surrounds the compacted particles and prevents the oxidizing atmosphere from contacting the compacted particles. This is necessary because if any of the coke which is included within the compacted particles is oxidized, there will be insufficient coke to reduce the phosphate ore to elemental phosphorus. It should be noted that the coke, which is included within the compacted particle, is the only substantial source of carbon used to reduce the phosphatic ore. This is due to necessity for intimate contact of the phosphate with the reducing agent—carbon. The free coke surrounding a compacted particle can only cause phosphorus evolution at the surface of the compacted particle wherever random contacts of the compacted particle and free coke occur. A high degree of phosphorus evolution can only take place within the compacted particle if the pelletized carbonaceous material which is in intimate contact with the phosphate core is used as the reducing agent.

The free coke serves to prevent the oxidizing atmosphere from contacting the compacted particles by combining with any oxygen which comes in contact with the bed, thereby producing carbon monoxide throughout the kiln. The major amount of carbon monoxide is obtained as a result of the phosphorus reduction. It is constantly evolved from the surface of the free coke bed and acts as an upward flowing reducing blanket of carbon monoxide covering both the free coke layer and compacted particles which are buried within the mass of free coke.

The free coke also serves to prevent the compacted particles from agglomerating together during the heating period within the kiln by physically separating the discrete particles. The compacted particles are subject to agglomeration because an unavoidable amount of softening of the compacted particles occurs at the high temperatures required to reduce the phosphate ore to elemental phosphorus. Such agglomeration is undesirable because the agglomerates would then be of larger particle size than the free coke and would come to the surface of the free-coke bed. Without the cover of a free-coke bed, the coke within the compacted particles likely is more subject to oxidation by the oxidizing stream which is located at the top of the kiln, since only the gaseous bed of CO being evolved at the surface of the free-coke bed separates it from the oxidizing atmosphere above. Oxidation of the coke within the compacted particles by air must be avoided if good phosphorus elimination is to be obtained.

In a similar manner, the gas stream containing the $P_2O_5$ at the top of the kiln must not contact the carbon which constitutes the free-coke bed. If this occurs, the $P_2O_5$ is reduced to elemental phosphorus according to the following equation:

$$P_2O_5 + 5C \rightarrow \tfrac{1}{2}P_4 + 5CO$$

This contact is materially avoided in the instant process because the carbon monoxide, which is continually evolved during the phosphorus reduction, blankets the free-coke bed, and flows upward to be oxidized to $CO_2$. This upward flowing of carbon monoxide tends to prevent the oxidizing stream flowing along the top of the kiln from contacting the free-coke bed below it.

The carbon which is employed as free coke in this process is generally added in the form of pure, preformed coke. It is possible to employ coal in place of coke by mixing the hot slag from the kiln with coal in a secondary rotary furnace in order to obtain a coke-like product. This product can then be used in place of coke to supply the free coke necessary for the process.

This coal conversion step is advantageous in that it recovers some of the sensible heat from the discharged slag.

In the above-described process, none of the feed ingredients is subject to a pre-treatment other than simple grinding and pelletizing. However, many phosphate ores contain sizable amounts of calcium fluoride, the ore being expressed by the formula $3Ca_3(PO_4)_2 \cdot CaF_2$. The fluoride component is undesirable in the kiln feed because it tends to lower the temperature at which sintering takes place within the kiln. Sintering is undesirable because it permits the feed pellets to agglomerate, with the result that phosphorus elimination from the ore can be materially reduced. This is particularly true where high $CaO/SiO_2$ ratios are employed in the feed, and a discrete, easily separable slag is desired. In general, higher temperatures are necessary for reduction of phosphorus from burdens containing high $CaO/SiO_2$ ratios, and these temperatures increase the stickiness and possible sintering of the pellets. The calcium fluoride is also undesirable since some of the fluoride contaminates the overhead gases.

In the preferred mode of operation, the phosphate feed is subject to a preliminary defluorination step in a fluid bed reactor. Defluorination is preferably accomplished in the manner described in my co-pending application, Serial No. 203,893 filed June 20, 1962. In this process, the phosphate ore is ground to about −10 mesh and subjected to a desliming operation. This is accomplished by washing the phosphate feed with water in order to classify the phosphate-containing particles from the smaller colloidal particles containing silica and low fusion point impurities. These colloidal particles are below about 5 microns in diameter, although particles as coarse as about 50 microns can be removed along with the colloidal particles during the classification. The desliming operation also permits control of the $CaO/SiO_2$ ratio of the feed. The desliming operation effects a qualitative separation of the phosphate ore because the phosphate values are generally found in the larger-sized particles, while the silica and low fusion point impurities are found in the smaller colloidal particles of the ore.

The deslimed phosphate ore is then dried and pulverized to about −100 mesh. This crushed ore is placed in a blender along with silica and/or lime. The lime is added along with silica to regulate the proportion of CaO to $SiO_2$ in order to avoid sintering during defluorination. The calcium values can be added, if desired, through the recycle of slag (calcium silicate) from the kiln, as hereinafter described. The final adjustment of the $CaO/SiO_2$ ratio is adjusted in the blender. The mass from the blender is then compacted and screened to give about a −6 +20 mesh granular product. The compacted particles are then subjected to defluorination in a fluid bed. The defluorination unit consists preferably of a three-stage fluid bed reactor. The top stage is used for pre-calcination of the deslimed compacted particles at a temperature of about 1000° C. In this stage, the feed particles are pre-heated in a fluid bed before overflowing into the defluorination chamber in order to obtain a hard, dust-free pellet prior to defluorination. After passing through the first stage, the pre-heated compacted particles are subject to defluorination in the second stage of the fluid bed reactor at a temperature of about 1300° C. Defluorination takes place in the presence of steam according to the following equation:

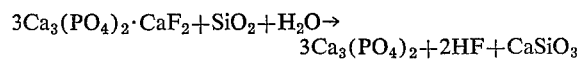

$$3Ca_3(PO_4)_2 \cdot CaF_2 + SiO_2 + H_2O \rightarrow 3Ca_3(PO_4)_2 + 2HF + CaSiO_3$$

The defluorinated calcine is then passed to the last stage in countercurrent contact with air to quench the calcine and pre-heat the air for combustion in another zone. Water may be added to the cooling stage, as desired, to supply an optimum concentration of steam to the defluorinating chamber. The hydrogen fluoride-bearing gas stream which is discharged from the defluorination chamber is subjected to a recovery step to remove the hydrogen fluoride. The above process has been found to remove on the order of about 99% of the fluorine contained in the ore.

The defluorinated calcium phosphate particles which are recovered from the defluorination unit contain primarily phosphates and silicates of calcium. The proportion of these components in the final compacted particles can be controlled in two ways. One direct method is by mixing varying amounts of silica and/or lime or slag from the kiln with the crushed and pulverized phosphate feed in the blender prior to defluorination. A second method is by controlling the desliming step to remove a desired proportion of silica in the phosphate feed. These two methods can be employed separately or in combination to regulate the make-up of the feed particles. In any event, the final mixture from the blender which is compacted into particles, must contain the proportions of calcium compounds to $SiO_2$ which desirably avoid sintering in the defluorinator.

The cooled calcined phosphate particles which are removed from the defluorinating chamber must be impregnated with carbon to render them suitable for use as feed particles in the kiln. This is most preferably accomplished by means of a fluid bed coater. Alternate methods such as pelletizing the finely ground defluorinated ore and coal mixtures with water have not been found as desirable because the finely ground defluorinated ore does not possess any binding characteristics. Accordingly, if pelletizing is desired, an extraneous binding material other than water must be used to form acceptable pellets, which necessarily complicates the pelletizing operation.

By contrast, in the fluid bed coater, the phosphate particles simply are passed into the fluid bed maintained at a temperature of about 500° C. to 1000° C., along with a finely ground, low-grade coal. The sensible heat of the fluidized defluorinated phosphate particles contributes to the heat requirement necessary for melting and carbonizing the coal. The coal first becomes sticky and adheres to the phosphate particle. It then carbonizes to a non-tacky, hard, adhering coating. An alternate method is to coat the defluorinated particles by cracking methane within the fluid bed reactor and to deposit the evolved carbon on the hot phosphate particles. In either case, carbon is adherently deposited on the phosphate particle and penetrates the surface of the phosphate particle through many fissures, thereby yielding a particle in which carbon is in intimate contact with the phospahte in the feed particles. The carbon-treated, defluorinated phosphate particles are then employed as the feed particles in the kiln.

In order to illustrate the present invention, two drawings have been employed, in which:

FIGURE 1 represents a description of the simultaneous reduction and oxidation taking place in a kiln.

FIGURE 2 represents a flow plan of the preferred embodiment of the invention in block form.

The drawings are given to illustrate one mode for carrying out the invention and are not limiting of the invention.

In FIGURE 1, a rotary kiln 2, which is rotated by means of drive rollers 16, has ends which terminate into air-tight walled chambers 12 and 22. In carrying out the process, the feed, which is a mixture of compacted particles and free coke, enters hopper 4 and is propelled by conveyor 6 to the entry duct 8 and into the kiln 2 through the feed end entry to the kiln 10. The compacted particles, which are composed of phosphate rock, silica and/or lime, and a carbonaceous material are preferably about −6 +20 mesh in size, although they may be either larger or smaller in size. The free coke must be of larger particle size than the feed particles, the exact size being determined by the size of the compacted particles. When −6 +20 mesh compacted particles are employed, free-coke particles of about −3 +6 mesh have been found most suitable. A free coke to feed particle weight ratio of 4:1 has been found to be satisfactory in a pilot rotary kiln. Lower ratios, on the order of about 1:1, can be employed in scaled-up commercial kilns, since the bed depths of such kilns will be greater. The exact ratio which can be employed depends upon the depth of bed, size of particles, etc., and is regulated so that the pellets are not subject to surfacing. Ratios which are too low are not desirable because the pellets will tend to surface and result in poor phosphorus elimination. Higher ratios can be employed but are unnecessary and undesirable since they reduce the $P_2O_5$ producing capacity of the kiln.

As the kiln slowly rotates, the feed (free coke 28 and the compacted particles 30, which are below the surface of the free-coke bed) moves towards the slag-discharge end of the kiln and is heated in pre-heating zone A. The heat is supplied by the oxidation both of phosphorus to $P_2O_5$ and carbon monoxide to carbon dioxide in the oxidizing gas stream at the top of the kiln. When the feed reaches the end of zone A and the beginning of reaction zone B, it has been heated to a temperature of about 1150° C. At this temperature, phosphorus and carbon monoxide commence to be liberated by reduction of the phosphate values in the compacted particles. These evolved gases flow upward through the bed of free coke 28 to the top of the rotating kiln. As the feed progresses through reaction zone B towards the slag-discharge end of the kiln, the temperature of the feed increases to about 1400° C. The maximum temperature which can be employed is limited by that temperature which causes sintering of the compacted particles.

At temperatures of about 1400° C., the phosphate reduction proceeds to substantial completion and both phosphorus and carbon monoxide are evolved in a steady stream from the surface of the free-coke bed 28 throughout zone B. The phosphorus and carbon monoxide are oxidized by air introduced at the top of the kiln. The air is admitted through suitable ports 18 spaced longitudinally along the kiln. A slight excess of air is normally employed in order to assure complete combustion of the gases. The composition of the oxidizing atmosphere at the top if the kiln can be controlled by regulating the amount of air introduced through ports 18. Larger or smaller amounts of air can be admitted through each of the various ports, depending upon the amount of oxygen required for combustion at various locations in the kiln. The oxidizing stream containing phosphorus, carbon monoxide, $P_2O_5$, $CO_2$ and $N_2$ flows along the top of the kiln towards the feed end of the kiln in a countercurrent direction to the flow of the feed. When the oxidizing stream reaches feed end entry 10, all of the phosphorus and carbon monoxide evolved from the phosphate reduction have been oxidized to $P_2O_5$ and $CO_2$, respectively. The oxidizing stream containing $P_2O_5$, $CO_2$ and residual nitrogen passes into chamber 12 and into duct 14 where the $P_2O_5$ is recovered from the oxidizing stream.

The compacted particles, free of phosphorus values, are discharged along with the free coke through the slag-discharge opening 20 into chamber 22. The slag and free coke are conveyed through a gas-sealing means 24 and discharged through conduit 26. The free coke is separated from the slag and returned to hopper 4 along with fresh phosphate-containing compacted particles.

In the preferred embodiment of the present invention, as illustrated in block form by FIGURE 2, a coarse phosphate ore having a particle size of about −10 mesh is pre-treated to remove fluorine in the manner taught by my co-pending application, Serial No. 203,893, filed on June 20, 1962. In this process, the ore is treated in classifier 102 in order to remove undesirable slimes from the larger phosphate ore particles. The deslimed ore is conveyed by conduit 104 to a pulverizer 106 where the ore is reduced to −100 mesh. The pulverized ore is then passed through conduit 108 to blender 110. Silica and/or lime are added to blender 110 either in the form of pulverized slag through conduit 114 or from an outside source through conduit 112. During the blending operation, the proportion of calcium compounds to $SiO_2$ is adjusted to give a non-sintering composition during subsequent defluorination. The blended mass is passed through conduit 116 to a compact mill 118 where the mixture is compacted to give about a −6 +20 mesh granular product. The compacted mass is passed through conduit 120 to a screen 122 where the −6 +20 mesh particles are separated from larger-sized agglomerates. The larger agglomerates are crushed and returned to the compact mill by means not shown. The −6 +20 mesh compacted particles are then conducted through conduit 124 to a fluid bed 126. Particles are defluorinated in fluid bed 126 at temperatures of about 1050° C. to 1450° C. and hydrogen fluoride is removed from the fluid bed and passed through conduit 128 to separator 130. In separator 130, hydrogen fluoride is separated from fines and the fines recycled through conduit 132 to blender 110. The defluorinated particles are removed from the base of the fluid bed 126 and passed via conduit 134 to fluid bed coater 136. In fluid bed coater 136, the defluorinated particles are coated with carbon. The carbon may be introduced with the fluidizing gas into the fluid bed coater 136 in the form of a pulverized, low-grade coal. The fluid bed 136, which is maintained at a temperature of from about 500° C. to 1000° C., heats the coal, making it soft and tacky. The heated coal adheres to the defluorinated particles and is carbonized to a hard, adhering coating. As an alternate method, the carbon coating can be supplied by cracking methane or other hydrocarbon gas within the fluid bed coater 136. The carbon-coated particles are removed from the fluid bed coater 136 through conduit 138. The carbon-coated particles are mixed with free-coke particles 140 and passed through conduit 142 into kiln hopper 44. The phosphorus values in the feed mixture are first reduced and then oxidized in kiln 46 in the manner previously described and the $P_2O_5$ is removed through duct 48. The $P_2O_5$ gaseous mixture is passed through conduit 150 to $P_2O_5$ recovery means 152 where it is contacted with water to extract the $P_2O_5$ in the form of a phosphoric acid product 154. Slag and free coke are removed from the slag-discharge end of kiln 156 and conveyed through conduit 158 to a cooler 160. The cooled mixture is then passed through conduit 162 to a separator 164 in which the coke is separated from the slag. The separated coke is recycled through line 140 for reuse in the kiln 146. The separated slag is discarded through conduit 170, except for a portion which is passed through conduit 166 to pulverizer 168. The pulverized slag from pulverizer 168 is conveyed via conduit 114 to blender 110 in order to supply calcium values to the phosphate feed in blender 110.

The following examples are presented by way of illustration only and are not deemed to be limiting to the present invention.

*Example 1*

One hundred parts by weight of a Florida phosphatic rock, containing 48.05% CaO, 32.53% $P_2O_5$, 7.83% $SiO_2$, 3.70% fluorine, 1.35 $Al_2O_3$, 17 parts of coke and 30 parts of silica were finely ground to −150 mesh, dry blended and pelletized with water in a rolling drum. The resulting pellets were dried in a small rotary drier and were then screened to obtain a −10 +20 mesh fraction. The dried pellets, on analysis, were found to contain 23.2% $P_2O_5$ and 32.5% CaO. A charge was made up containing 2000 grams of the −10 +20 mesh pellets and 8000 grams of −3 +6 mesh free coke (loss on ignition of coke equals 88.6%). A pilot plant rotary kiln having a diameter of 28 inches and containing an initial bed of coke was preheated by internal firing with an air-propane mixture until the coke particles reached a temperature of 1280° C. at the slag-discharge end of the kiln. The charge was added to the preheated kiln at a rate of 50 grams per minute. The kiln was internally fired with the air-propane mixture and the feed charge was brought up to a final temperature of 1280° C. The kiln was rotated at a rate of 0.4 r.p.m. Air was introduced at a rate of 25.6 c.f.m. at 70° F. and 760 mm. of Hg. Phosphorus evolution was continuous during the run. After the entire charge was added to the kiln, coke was added continuously at 50 grams per minute to flush out all of the pellets in the kiln. The feed was subjected to temperatures of over 1225° C. for a total of 238 minutes during its travel through the kiln; thereafter, the kiln was shut down. During the run, the overhead gases which passed countercurrently to the flow of the feed were removed from the kiln and were found to contain the following:

| Gas | Mole Percent | Mole $O_2$/100 moles of exhaust gas |
|---|---|---|
| $N_2$ | 52.8 | |
| CO | 18.7 | 9.35 |
| $CO_2$ | 1.83 | 1.83 |
| $H_2$ | 20.9 | |
| $H_2O$ | 5.75 | 2.88 |
| $P_2O_5$ | 0.022 | .009 |

A weight balance of the system is as follows:

$P_2O_5$ produced=340 grams
Percent $P_2O_5$ elimination=73.4
Carbon in free coke consumed=446 grams
Carbon consumed for reduction=144 grams
Total carbon consumed=590 grams The results of the gas analysis showed that oxygen was available in about 50% excess required for combustion of both the phosphorous and propane fuel gas (and any other carbon values) to $P_2O_5$ and CO, respectively.

Since these values show an oxidizing atmosphere existing in the vapor space above the bed with respect to elemental $P_4$, it is apparent that elemental phosphorous released from the bed must be oxidized to $P_2O_5$. The relatively low concentration of $P_2O_5$ in the exit gases of the pilot of the kiln is due to the large amount of gaseous fuel which must be burned to supply heat lost from the small pilot kiln and which dilutes the $P_2O_5$ content of the gas stream. As a result, large volumes of gases are introduced into this pilot kiln which otherwise would be unnecessary in scaled-up kilns where heat losses are reduced to acceptable values.

The sintered residue which was continually removed from the slag-discharge end of the kiln was cooled and screened to separate a −10 +20 mesh slag fraction from the free coke. A total of 1209 grams of this slag fraction was recovered and found to contain on analysis:

| | Percent |
|---|---|
| $P_2O_5$ | 7.0 |
| CaO | 36.9 |
| LOI (loss on ignition) | 17.3 |

The high LOI in the −10 +20 mesh fraction indicated that some free coke was present in the slag product.

Example II

The following example was carried out using a non-agitated static kiln, containing a moving pallet.

Florida phosphate rock containing 48.05% CaO, 32.53% $P_2O_5$, 7.83% $SiO_2$, 3.70% fluorine and 1.39% $Al_2O_3$ was deslimed by repeated washing and settling in water until the colloidal slime particles were decanted and removed. One hundred parts of this deslimed rock, 17 parts of coke and 30 parts of silica were finely ground to −150 mesh, dry blended and pelletized with water in a rolling drum. The resulting pellets were dried in a small rotary drier and were then screened to obtain a −¾ +½ inch fraction. The dried pellets, on analysis, were found to contain 23.2% by weight $P_2O_5$ and 32.5% by weight CaO A charge was made up containing 2272 grams of the −¾ +½ inch pellets and 6537 grams of −8 +35 mesh free coke (loss on ignition of coke equals 88.6%). This charge was placed in a pilot plant static kiln. The charge was stacked on the movable pallet in the kiln as follows. A layer of the free coke was deposited covering the entire base of the pallet. Pellets were carefully placed on the free coke layer so that they were out of contact with each other. A layer of free coke was then placed over the pellets. Successive layers of pellets and coke were carefully stacked until three layers of pellets and coke were deposited. The upper pellet layer was then covered with additional free coke. The kiln was internally fired with an air-propane mixture and was brought up to a final temperature of 1415° C. Air was introduced at a rate of 44.5 c.f.m at 70° F. and 760 mm. of Hg. The pallet containing the charge was slowly moved through the kiln. Phosphorus evolution commenced at about 1225° C. and continued at the higher temperatures of about 1415° C. The charge was subject to temperatures above 1225° C. for a total of 632 minutes; thereafter, the kiln was shut down. The overhead gases, which were passed countercurrent to the movement of the pallet were analyzed as they were removed from the kiln and found to contain $P_2O_5$. Phosphorus elimination from the pellets and conversion to $P_2O_5$ was 81% of the phosphorus charged. Sufficient pelletized carbon remained in the slag residue of the heated pellets to complete the phosphate reduction.

Example III

A −10 mesh phosphate ore from the Western United States containing 25.15% $P_2O_5$, 36.55% CaO, 23.68% $SiO_2$, 2.47% fluorine and having a loss on ignition (LOI) of 5.92% was deslimed by repeated washing and settling in water until the colloidal slime particles were decanted and removed. After the desliming procedure was completed, the phosphate ore contained 30.44% $P_2O_5$, 45.18% CaO, 14.36% $SiO_2$, 2.97% fluorine and had an LOI of 5.89%. One hundred parts by weight of this deslimed ore, 83.4 parts of slime hydrate, and 24.4 parts of sand were finely ground to −150 mesh, dry blended and pelletized, with water in a rolling drum. The resulting pellets were dried in a rotary drier and screened to obtain a −10 +20 mesh fraction. Five thousand grams of these pellets were placed in a fluid bed defluorinating unit. The fluid bed unit was positioned within an outer cylinder; the major heat requirement was supplied by burning propane within the annular space made up by the outer surface of the fluid bed unit and the outer cylinders. A gas stream containing excess air and propane was passed upward through the bottom of the tubing to fluidize the bed at 3.5 feet per second and to supply both heat and water from the combustion of the propane. The bed was slowly heated and traces of hydrogen fluoride were evolved, commencing at temperatures of 1050° C. Heating was continued until a maximum temperature of 1325° C. was reached. The pellets were heated for a total of 381 minutes at temperatures above 1050° C. Three thousand grams of −10 +20 mesh pellets, defluorinated in the manner described above, were then placed in a 4-inch i.d. fluid bed coater. The fluid bed coating apparatus was positioned within an outer cylinder; heating was accomplished by burning propane within the annular space made up by the outer surface of the fluid bed coater and the outer cylinder. Nitrogen was passed into the base of the fluid bed coater at a rate of 4.73 s.c.f.m. and the temperature of the bed was raised to about 850° C. Pulverized, soft coal (−150 mesh) was fed into the base of the fluid bed coater at a rate of 6.2 grams per minute for a total of 90 minutes.

Thereafter, the coater was shut down, the pellets were cooled and were analyzed. The pellets contained 14.5% $P_2O_5$, 50.5% CaO, 19.35% $SiO_2$, only trace amounts of fluorine and had an LOI of 9.95%.

A charge of 1500 grams of the −10 +20 mesh coated defluorinated pellets and 6000 grams of −3 +6 mesh coke was treated in a pilot plant rotary kiln having a diameter of 28 inches and containing an initial charge of coke in the manner described in Example I. The kiln was internally fired with an air-propane mixture and the feed charge was brought up to a final temperature of 1400° C. The kiln was rotated at a rate of 0.33 r.p.m., air was introduced into the kiln at a rate of 33.8 s.c.f.m at 70° F. and 760 mm. of Hg. Phosphorus evolution was continuous during the run. The feed was subjected to temperatures of over 1325° C. but no higher than 1400° C., for a total of 300 minutes during its travel through the kiln; therafter, the kiln was shut down. During the run, the overhead gases which pass countercurrent to the flow of the feed were removed from the kiln and upon analysis were found to contain $P_2O_5$. Phosphorus elimination from the pellets and conversion to $P_2O_5$ was 82.6% of the phosphorus charged.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims the invention may be practiced by those skilled in the art, and having the benefit of this disclosure, otherwise than as specifically described and exemplified herein.

What is claimed is:

1. A process for the production of $P_2O_5$ from a phosphate-containing ore which comprises introducing into a heating zone a feed comprising
    (a) compacted particles containing a phosphatic ore, silica and a carbonaceous material and
    (b) discrete particles of coke, maintaining said compacted particles beneath the upper surface of a bed of said discrete coke particles, heating said compacted particles and said discrete coke particles in said heating zone to from about 1200° C. to about 1500° C., whereby carbon monoxide and elemental phosphorus are evolved, introducing air into said heating zone, oxidizing said phosphorus and carbon monoxide as they are evolved to $P_2O_5$ and $CO_2$, respectively, in said heating zone in the presence of said feed, passing said oxidizing stream containing $P_2O_5$ and $CO_2$ countercurrently to the flow of said feed, whereby the exothermic heat evolved during said oxidation is used to heat said incoming feed to said 1200° C. to 1500° C. and to supply the necessary endothermic heat of reduction required for evolving said phosphorus, recovering said $P_2O_5$ from one end of said heating zone and recovering calcium silicate slag and coke from the opposite end of said heating zone.

2. A process for the production of $P_2O_5$ from a phosphate-containing ore which comprises
    (a) introducing about a −10 mesh phosphatic ore into a desliming classifier,
    (b) removing small colloidal particles as slimes from the phosphate-containing particles,
    (c) pulverizing the resulting deslimed phosphate-containing particles,
    (d) passing said pulverized deslimed phosphatic ore into a blender,
    (e) adjusting the proportions of calcium oxide to silicon dioxide of said phosphate ore in said blender to avoid sintering in the defluorination operation (g),
    (f) compacting said blended mass to obtain about −6 +20 mesh particles,
    (g) subjecting said compacted particles to a defluorination operation by heating said particles in a heating zone at above about 1050° C. in the presence of steam whereby hydrogen fluoride is separated,
    (h) coating said defluorinated particles with an adherent carbonaceous coating,
    (i) passing said carbon-containing compacted particles into a heating zone along with discrete coke particles,
    (j) maintaining said compacted particles beneath the upper surface of a bed of said discrete coke particles,
    (k) heating said compacted particles and said discrete coke particles in said heating zone to from about 1200° C. to 1500° C. whereby carbon monoxide and elemental phosphorus are evolved,
    (l) introducing air into said heating zone,
    (m) oxidizing said phosphorus and carbon monoxide as it is evolved to $P_2O_5$ and $CO_2$, respectively, in the presence of said feed mixture of particles,
    (n) passing said oxidizing stream containing $P_2O_5$ and $CO_2$ countercurrently to the flow of said compacted particles and discrete coke particles, whereby the exothermic heat evolved during said oxidation is used to heat said incoming compacted particles and discrete coke particles to said 1200° C. to 1500° C. and to supply the necessary endothermic heat of reduction required for said phosphorous evolution,
    (o) recovering said $P_2O_5$ from one end of said heating zone and
    (p) recovering calcium silicate slag and free coke from the opposite end of said heating zone.

3. Process of claim 1 where said feed is heated to about 1250° C. to about 1450° C. in said heating zone.

4. Process of claim 2 where said defluorination operation is carried out in a fluid bed.

5. Process of claim 2 in which said defluorinated particles are coated in a fluid bed.

6. Process of claim 2 in which a portion of said slag is recycled for blending with said pulverized phosphatic (−100 mesh) feed.

7. Process of claim 2 in which said $P_2O_5$ is recovered by water extraction to produce a phosphoric acid solution.

References Cited by the Examiner
UNITED STATES PATENTS

| | | | |
|---|---|---|---|
| 1,242,987 | 10/1917 | Schmitz | 23—165 |
| 1,630,283 | 5/1927 | Waggaman et al. | 23—165 |
| 1,655,981 | 1/1928 | Barr | 252—188.3 |
| 1,870,602 | 8/1932 | Case | 23—165 X |
| 2,075,212 | 3/1937 | Levermore et al. | 23—165 |
| 2,446,978 | 8/1948 | Maust | 71—47 |
| 2,961,411 | 11/1960 | Klugh | 252—188.3 |
| 2,967,091 | 1/1961 | Robertson | 23—223 |
| 3,056,659 | 10/1962 | Yarze et al. | 23—223 |

MAURICE A. BRINDISI, *Primary Examiner.*